United States Patent
Tada et al.

(10) Patent No.: US 9,404,814 B2
(45) Date of Patent: Aug. 2, 2016

(54) ENGINE EXHAUST HEAT TEMPERATURE DETECTION DEVICE

(75) Inventors: Hiroyuki Tada, Sakai (JP); Masato Asahara, Kobe (JP); Yoshihiro Ueda, Duluth, GA (US); Hideki Aoki, Sakai (JP); Akira Minoura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 230 days.

(21) Appl. No.: 13/421,047

(22) Filed: Mar. 15, 2012

(65) Prior Publication Data
US 2012/0307863 A1    Dec. 6, 2012

(30) Foreign Application Priority Data
May 31, 2011   (JP) .................................. 2011-122313

(51) Int. Cl.
*G01K 1/08* (2006.01)
*G01K 13/02* (2006.01)

(52) U.S. Cl.
CPC .......... *G01K 13/02* (2013.01); *G01K 2013/024* (2013.01); *G01K 2205/04* (2013.01)
USPC .......................................... 374/144; 374/141

(58) Field of Classification Search
CPC ...................................................... G01N 15/06
USPC ........... 374/144–146; 73/23.33, 28.01, 865.5, 73/114.69
See application file for complete search history.

(56) References Cited

U.S. PATENT DOCUMENTS

| 4,162,929 | A  | * | 7/1979  | Finney ..................... G01K 1/14 |
|           |    |   |         | 136/230 |
| 6,523,340 | B1 | * | 2/2003  | Kurihara et al. ................. 60/274 |
| 6,997,607 | B2 | * | 2/2006  | Iwaya et al. ................... 374/208 |
| 7,841,769 | B2 | * | 11/2010 | Ma et al. ........................ 374/147 |
| 8,192,081 | B2 | * | 6/2012  | Suzuki et al. ................. 374/163 |
| 8,303,174 | B2 | * | 11/2012 | Kasahara ...................... 374/144 |
| 2002/0106947 | A1 |   | 8/2002  | Ozawa |
| 2007/0089923 | A1 | * | 4/2007  | Oohashi et al. ............... 180/229 |
| 2007/0245725 | A1 | * | 10/2007 | Brown et al. ................... 60/317 |
| 2010/0319651 | A1 | * | 12/2010 | Kasahara ................. 123/198 R |

FOREIGN PATENT DOCUMENTS

| JP | 06-249010   | 9/1994  |
| JP | 08-189360   | 7/1996  |
| JP | 09-280034   | 10/1997 |
| JP | 2008-067634 | 3/2008  |
| JP | 2010-127268 | 6/2010  |
| JP | 2011-047773 | 3/2011  |

* cited by examiner

*Primary Examiner* — Lisa Caputo
*Assistant Examiner* — Nasir U Ahmed
(74) *Attorney, Agent, or Firm* — Greenblum & Bernstein, P.L.C.

(57) ABSTRACT

An exhaust gas temperature detection sensor is arranged at a predetermined position outside a muffler, or at a predetermined position outside an exhaust pipe constituting an exhaust gas flow passage on a more downstream side than the muffler in an exhaust direction. The sensor detects that an atmosphere temperature at the predetermined position outside the muffler has reached a predetermined temperature based on an increase in a temperature inside the muffler, or detects that an atmosphere temperature at the predetermined position outside the exhaust pipe has reached a predetermined temperature based on an increase in a temperature of an exhaust gas inside the exhaust pipe.

20 Claims, 13 Drawing Sheets

ENGINE EXHAUST HEAT TEMPERATURE DETECTION DEVICE

CROSS-REFERENCE TO RELATED APPLICATIONS

The present application claims priority under 35 U.S.C. §119 of Japanese Application No. 2011-122313, filed on May 31, 2011, the disclosure of which is expressly incorporated by reference herein in its entirety.

BACKGROUND OF THE INVENTION

1. Field of the Invention

The present invention relates to an engine exhaust heat temperature detection device for performing temperature detection of heat exhausted from an engine.

2. Description of Related Art

As an engine exhaust heat temperature detection device detecting a temperature of heat exhausted from an engine, conventional examples are known that are provided with structures disclosed in the following [1] and [2].

[1] An exhaust gas purification device that also serves as a muffler is provided on an upper rear side of an engine, and a detection portion of an exhaust gas temperature sensor is inserted into the inside of the exhaust gas purification device to detect the temperature of an exhaust gas that exists inside the exhaust gas purification device (see Related Art 1).

[2] A muffler is provided in the middle of an exhaust gas emission passage of an engine, and in addition, a temperature sensor for detecting an exit temperature of the exhaust gas is provided at an outlet of the muffler to detect the temperature of the exhaust gas at the outlet of the muffler (see Related Art 2).

[Related Art 1] Japanese Patent Laid-Open Publication No. 2011-47773 (paragraph [0038], FIGS. 1 and 4).

[Related Art 2] Japanese Patent Laid-Open Publication No. HEI 6-249010 (paragraph [0008], FIG. 1).

In the structure disclosed in Related Art 1, the temperature of the exhaust gas inside the exhaust gas purification device that also serves as a muffler is detected; and in the structure disclosed in Related Art 2, the temperature of the exhaust gas at the outlet of the muffler is detected. In these structures, the temperature of the exhaust gas is directly detected by using an exhaust gas temperature detection sensor. Therefore, as the exhaust gas temperature detection sensor, it is necessary to use a sensor for high temperature detection that has superior heat resistance so as to be capable of performing temperature detection while being exposed to a high temperature exhaust gas. For this reason, the exhaust gas temperature detection sensor itself becomes expensive, which tends to lead to an increase in the cost of the exhaust gas temperature detection device of the engine.

SUMMARY OF THE INVENTION

A purpose of the present invention is to provide an engine exhaust heat temperature detection device that can perform temperature detection of engine exhaust heat at a relatively low temperature region and can adopt an inexpensive temperature detection sensor.

As an aspect of an engine exhaust heat temperature detection device of the present invention, an exhaust gas temperature detection sensor is arranged at a predetermined position outside a muffler provided in an exhaust gas flow passage of an engine, or is arranged at a predetermined position outside an exhaust pipe constituting the exhaust gas flow passage on a more downstream side than the muffler in an exhaust direction. The exhaust gas temperature detection sensor detects that an atmosphere temperature at the predetermined position outside the muffler has reached a predetermined temperature based on an increase in a temperature inside the muffler, or detects that an atmosphere temperature at the predetermined position outside the exhaust pipe has reached a predetermined temperature based on an increase in a temperature of an exhaust gas inside the exhaust pipe.

According to the configuration of this aspect, the exhaust gas temperature detection sensor is arranged at a predetermined position outside a muffler provided in an exhaust gas flow passage of an engine, or is arranged at a predetermined position outside an exhaust pipe constituting the exhaust gas flow passage on a more downstream side than the muffler in an exhaust direction. In the way, the exhaust gas temperature detection sensor is not provided at a position where the exhaust gas temperature detection sensor is in a state directly exposed to the exhaust gas exhausted from the engine, but is provided at a position allowing an atmosphere temperature at the predetermined position outside the muffler to be detected, or at a position allowing an atmosphere temperature at the predetermined position outside the exhaust pipe to be detected. Thereby, an increase in the temperature inside the muffler or an increase in the temperature of the exhaust gas inside the exhaust pipe can be detected based on temperature detection at a lower temperature region as compared to the temperature inside the exhaust gas.

In the case where an unburned gas due to engine misfire flows into the muffler, and the like, the unburned gas may be burned due to the heat inside the muffler, and the catalyst inside the muffler may react abnormally, and thus high temperature exhaust gas may flow inside the muffler and on the more downstream side than the muffler in the exhaust direction. However, in the present invention, the exhaust gas temperature detection sensor is provided at the position allowing detection of the atmosphere temperature at the predetermined position outside the muffler or at the position allowing detection of the atmosphere temperature at the predetermined position outside the exhaust pipe. Therefore, in such cases, an abnormal increase in the temperature of the engine exhaust heat can be surely detected.

As a result, as the exhaust gas temperature detection sensor, without being limited to a sensor having superior heat resistance that allows a temperature of a high temperature exhaust gas to be directly detected, an inexpensive exhaust gas temperature detection sensor for performing temperature detection at relatively low temperature region can be adopted, and thus there is an advantage that the cost of the engine exhaust heat temperature detection device can be reduced.

As another aspect of the engine exhaust heat temperature detection device of the present invention, the exhaust gas temperature detection sensor is arranged within an air blowing passage for cooling of the engine.

According to the configuration of this aspect, the exhaust gas temperature detection sensor is arranged within the cooling air passage of the engine, and thus is located at a position allowing the exhaust gas temperature detection sensor to receive cooling effect due to the blowing air from the cooling fan. Therefore, the atmosphere temperature at the position where the exhaust gas temperature detection sensor is arranged is maintained at a degree about the same as the temperature inside the air blowing passage for cooling of the engine, as long as there is no abnormal rising in the temperature of the exhaust gas of the engine. Therefore, there is an advantage that, even when the exhaust gas temperature detection sensor is arranged near the muffler or the exhaust pipe to facilitate early detection of an increase in the temperature of the exhaust gas by an amount equal to or more than a predetermined amount, the atmosphere temperature in the surrounding area of the exhaust gas temperature detection sensor can be easily maintained in a predetermined state by using the cooling effect of the air blowing passage for cooling of the engine, in a usual operation state in which the temperature of the exhaust gas does not rise by an amount equal to or more than a predetermined amount.

As another aspect of the engine exhaust heat temperature detection device of the present invention, the exhaust gas temperature detection sensor detecting that an atmosphere temperature at the predetermined position outside the exhaust pipe has reached a predetermined temperature is provided near a bending portion of the exhaust pipe, and outside of a pipe peripheral wall on a far side of a curvature center of the exhaust pipe at the bending portion.

According to the configuration of this aspect, the exhaust gas temperature detection sensor is provided on the outside of the pipe peripheral wall at the bending portion of the exhaust pipe, where the degree of contact with the high temperature exhaust gas flowing inside the pipe is high, and on a far side of the curvature center of the exhaust pipe, where a heat spot tends to form due to more contact with the exhaust gas. Therefore, there is an advantage that an increase in the temperature of the exhaust gas by an amount equal to or more than a predetermined amount can be even more promptly and easily detected.

As another aspect of the engine exhaust heat temperature detection device of the present invention, the exhaust gas temperature detection sensor is mounted on a support frame supporting the exhaust pipe.

According to the configuration of this aspect, as a supporting device of the exhaust gas temperature detection sensor, the support frame supporting the exhaust pipe can be used. Therefore, there is an advantage that the mounting structure of the exhaust gas temperature detection sensor can be simplified, and the structure of the engine exhaust heat temperature detection device can be simplified.

As another aspect of the engine exhaust heat temperature detection device of the present invention, separately from the exhaust gas temperature detection sensor, a cooling water temperature detection sensor is provided detecting a temperature of cooling water in a radiator. The exhaust gas temperature detection sensor and the cooling water temperature detection sensor are connected to a common control circuit. When at least one of the temperatures detected by the two detection sensors reaches the predetermined temperatures that are respectively configured in the detection sensors, a required device is actuated.

According to the configuration of this aspect, the exhaust gas temperature detection sensor and the cooling water temperature detection sensor are provided. When at least one of the temperatures detected by the two detection sensors reaches the predetermined temperatures that are respectively configured in the detection sensors, a required device is actuated. Thereby, that the temperature of the exhaust heat of the engine has reached a predetermined temperature or higher can be even more surely detected. Further, the exhaust gas temperature detection sensor and the cooling water temperature detection sensor are connected to a common control circuit. Therefore, there is an advantage that an actuation circuit of the required device can be simplified, and the structure of the engine exhaust heat temperature detection device can be simplified.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 11 is a perspective view illustrating a mounting structure of alarm buzzer and the like.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, an example of an embodiment of the present invention is explained based on the description of the drawings.

(Overall Configuration of Riding Type Mower)

Figure 1:
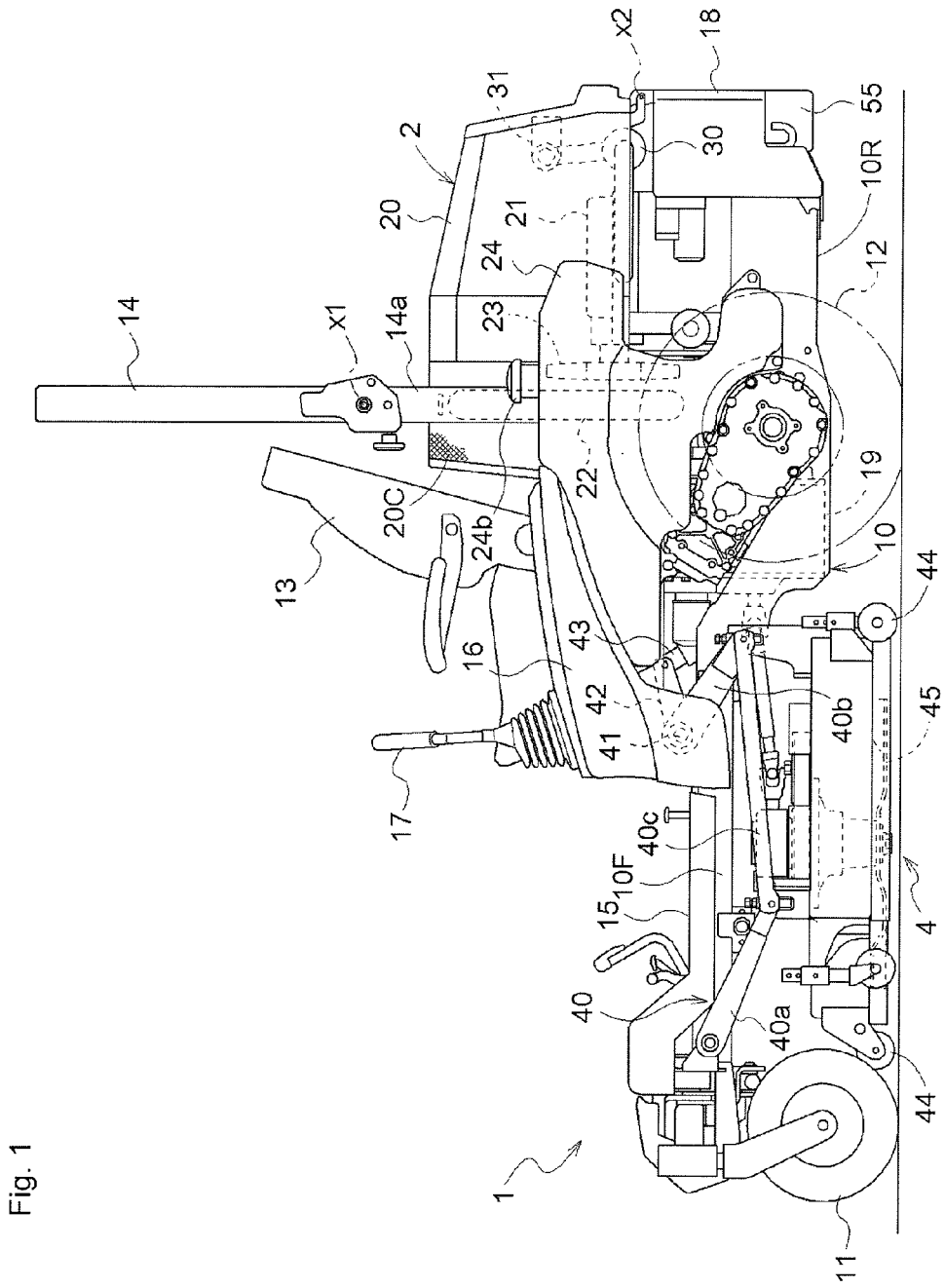
FIG. 1 is an entire side view of a riding type mower.
Figure 2:
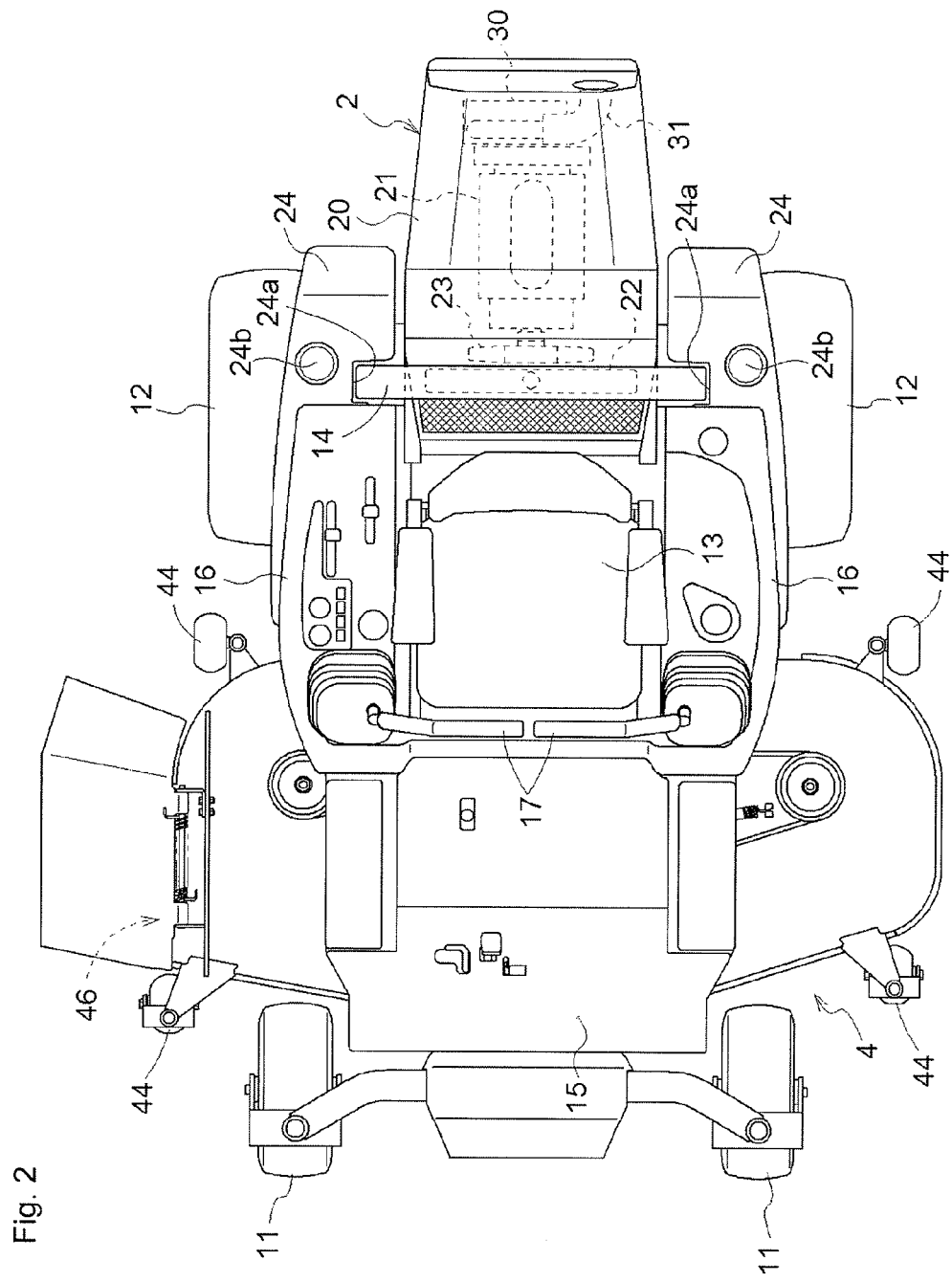
FIG. 2 is an entire plan view of the riding type mower.

FIGS. 1 and 2 are, respectively, an entire side view and an entire plan view of a riding type mower as an example of a working vehicle using an engine exhaust heat temperature detection device according to the present invention. This riding type mower is configured in a so-called mid-mount type in which a bar blade type mower 4 is vertically movably suspended and supported between a pair of front wheels 11 and a pair of rear wheels 12 of a self-propelled vehicle body 1, which is provided with a vehicle body frame 10 supported by the front and rear wheels. At a rear portion of the self-propelled vehicle body 1, a drive unit 2 housing an engine 21 under a hood 20 is provided on a rear side frame portion 10R of the vehicle body frame 10; and, at a longitudinally middle portion of the self-propelled vehicle body 1, a driver seat 13 is provided.

At the rear of the driver seat 13, a gate-shaped rollover protection frame 14 is fixedly provided in a manner substantially vertically upright in a side view. The rollover protection frame 14 is configured to be backward foldable about a supporting point x1 at a vertically middle portion of the rollover protection frame 14. When mowing around a trunk of a tree, by folding the rollover protection frame 14, mowing can be performed without having the rollover protection frame 14 being stuck with a protruding branch. On a front side frame portion 10F of the vehicle body frame 10, a step 15 located at the foot of the driver seat 13 is mounted. In addition, on the left and right of the driver seat 13, fenders 16 are provided, and, from the lower side of the fenders 16 toward the rear side, fuel tanks 24 are provided. The fuel tanks 24 are provided on laterally outer vehicle body sides of the rollover protection frame 14. On surfaces of the fuel tanks 24 facing inner side of the vehicle body and opposing the rollover protection frame 14, recesses 24a are provided allowing the rollover protection frame 14 to be fitted thereto. The rollover protection frame 14 is provided in a state of being fitted to the recesses 24a. Supply ports 24b for refueling are integrally formed at laterally outer side positions of the rollover protection frame 14 of the fuel tanks 24.

The pair of left and right front wheels 11 are configured with caster type idling wheels. The pair of left and right rear wheels 12 are configured as drive wheels that are left and right independent and capable of variable speed changing and forward and reverse rolling operations. By forward driving or reverse driving the left and right rear wheels 12 together with equal speeds, forward or backward straight traveling can be performed. By providing a speed difference to the left and right rear wheels 12, steering toward any direction and rotation can be performed. That is, axial plunger type left and right hydrostatic continuously variable transmissions (hereafter referred to as hydrostatic transmissions) (not illustrated in the drawings) driven by the power of the engine 21 are provided, and the left and right rear wheels 12 are configured to be driven by output forces of the left and right hydrostatic transmissions. Swash plate angle operating units of the hydrostatic transmissions and change speed levers 17 that are back and forth swingably arranged on the left and right of the driver seat 13 are linked. Therefore, when the change speed levers 17 are kept at neutral positions in the front-rear direction within their operation ranges, the hydrostatic transmissions are in a neutral and stopped state. By operating the change speed levers 17 forward from the neutral positions, forward speeding is performed, and by operating the change speed levers 17 backward from the neutral positions, reverse speeding is performed.

The mower 4 is suspended and supported on the vehicle body frame 10 by link mechanisms 40, in which a pair of left and right front swing links 40a and a pair of left and right rear swing links 40b are linked by middle links 40c. Swing arms 42 integrally provided on a support shaft 41 are linked to the link mechanisms 40, the support shaft 41 integrally swingably supporting the rear swing links 40b. In this configuration, by swingably actuating the swing arms 42 in conjunction with expanding and contracting actuation of a hydraulic cylinder 43 provided between the swing arms 42 and the vehicle body frame 10, the link mechanisms 40 are actuated to move the mower 4 up and down, which allows a switching operation to be performed between a lowered and working state in which gauge wheels 44 touch the ground or nearly touch the ground and a raised and non-working state in which the gauge wheels 44 are away from the ground and are stored under the belly of the vehicle body frame 10. As FIG. 2 illustrates, the mower 4 is configured as a side discharge type mower in which grass cut by bar blades 45 is discharged from a discharge opening 46 located on the right lateral side of the self-propelled vehicle body 1.

(Configuration of Drive Unit)

Figure 3:
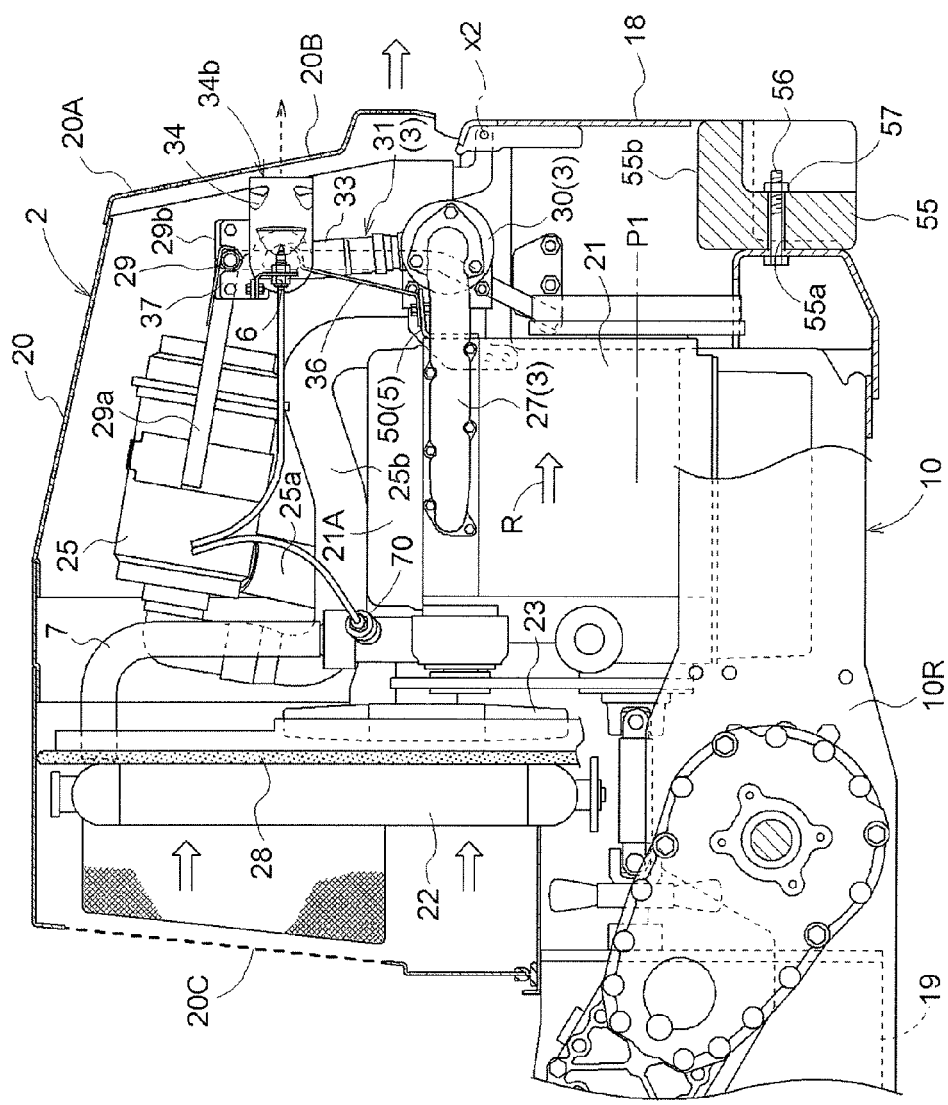
FIG. 3 is a left side view of a drive unit.
Figure 4:
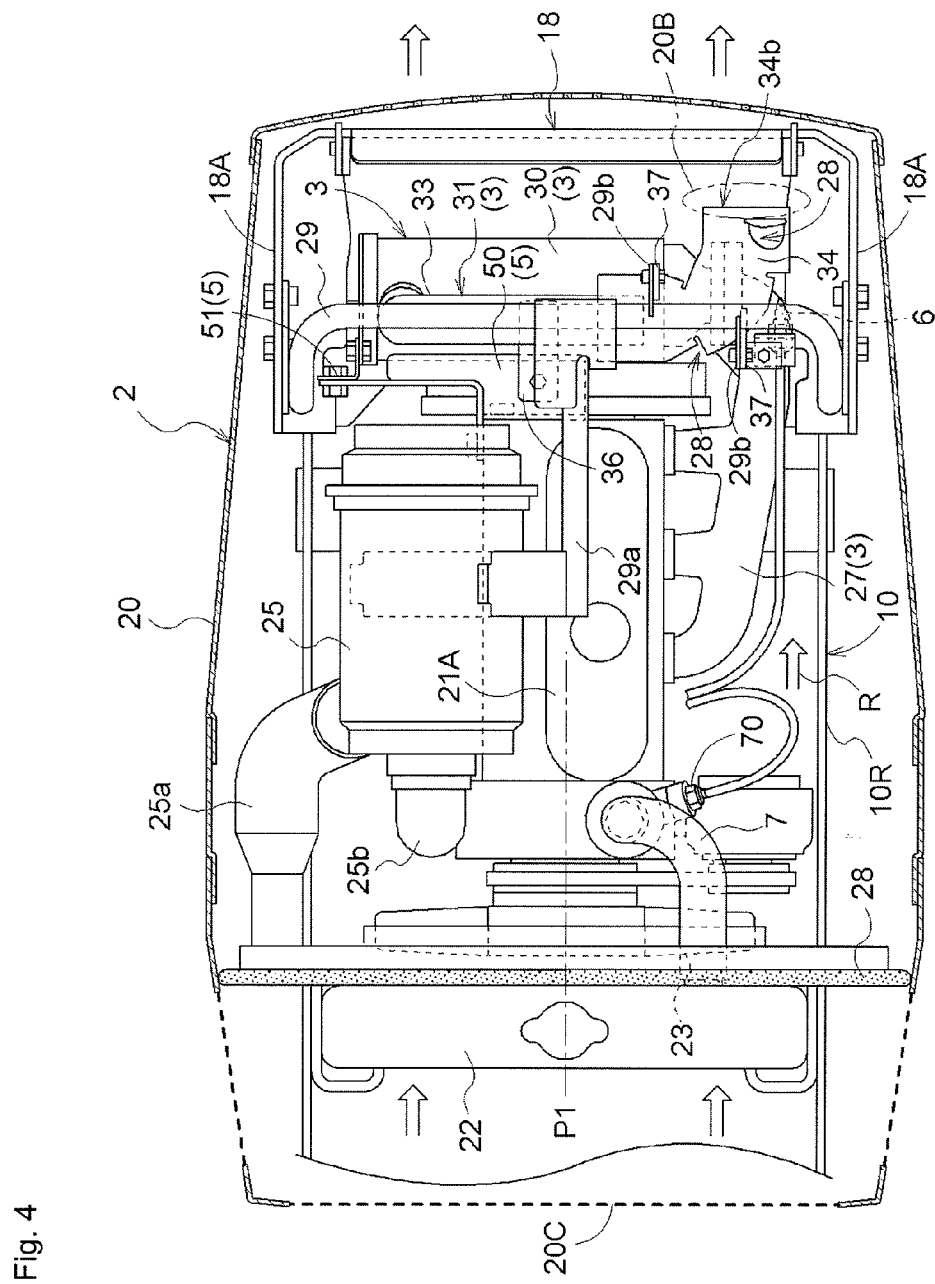
FIG. 4 is a plan view of the drive unit.
Figure 5:
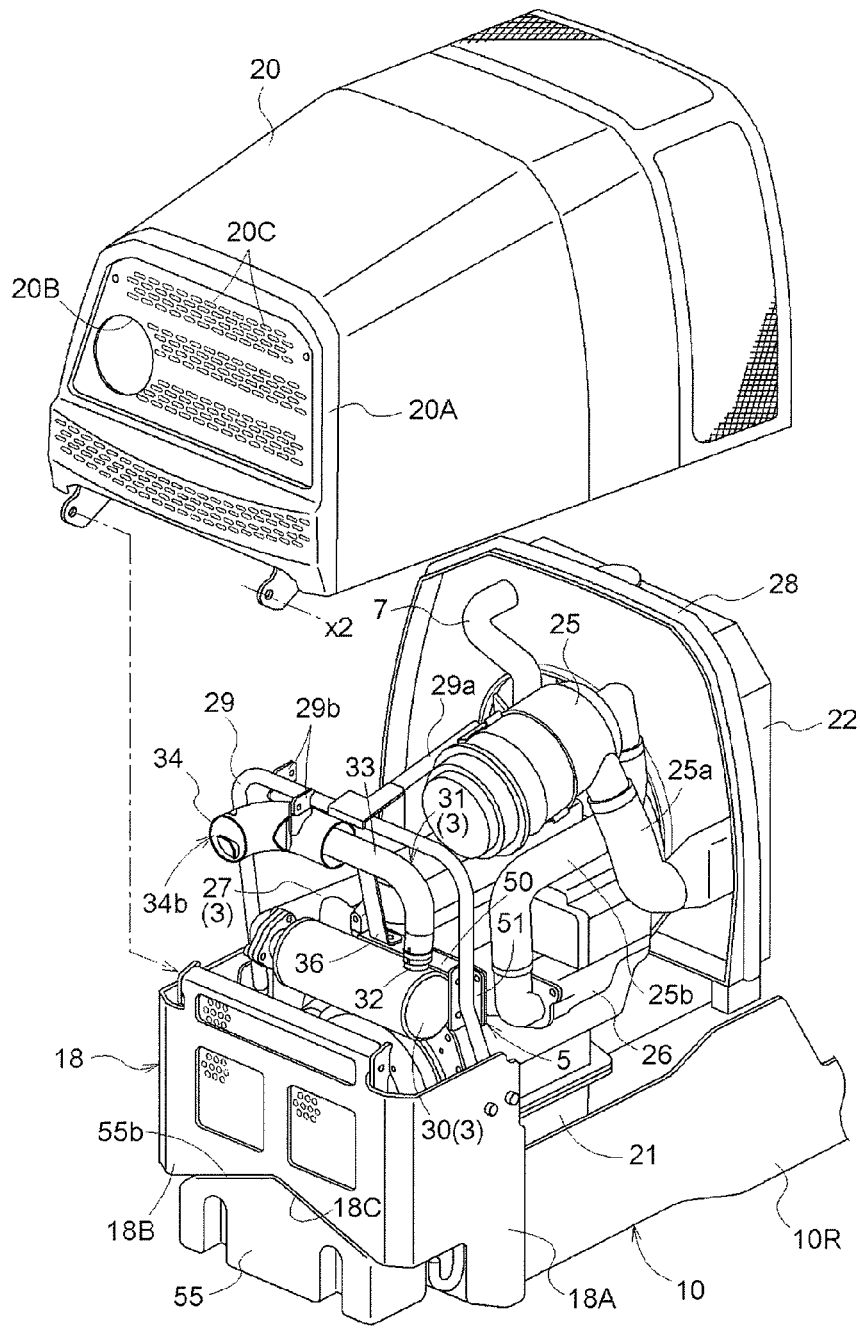
FIG. 5 is a perspective view illustrating the drive unit in a state in which a hood is separated.

As FIGS. 3-5 illustrate, in the drive unit 2, under the hood 20, the engine 21 that is a water-cooled gasoline engine having a radiator 22 arranged on a front side of the engine 21 is arranged in an upright state with an axis P1 of an output shaft (not illustrated in the drawings) oriented in the longitudinal direction. The hood 20 covering the engine 21 and the radiator 22 in front of the engine 21 is arranged at an upper end of a rear frame 18 in a manner swingable about a laterally oriented support point x2 to open and close, the rear frame 18 being erected from the rear side frame portion 10R. An front end side of the hood 20 is supported by a front frame 28, which has lower portions on two sides being fixed on the vehicle body frame 10 and is erected in a manner supporting an upper portion of the radiator 22.

On the back of the radiator 22, a cooling fan 23 is provided, which is driven to rotate by the power from the output shaft of the engine 21. Outside air introduced by suction through a dust prevention net 20C for dust removal, which is provided on the front side of the radiator 22, is supplied to the radiator 22.

The engine 21 is rubber-mounted on the rear side frame portion 10R via anti-vibration rubber (not illustrated in the drawings), and is mounted in a manner such that vibration on the engine 21 side is not directly transmitted to the vehicle body frame 10 side. On the front side of the engine 21, a front side transmission case 19 and the output shaft (not illustrated in the drawings) that transmits a drive force to the cooling fan 23 are provided. Power is output from the transmission case 19 to the mower 4 on the front side and the hydrostatic transmissions of the left and right rear wheels 12.

As FIGS. 3-5 illustrate, an air cleaner 25 is provided on the right lateral side of the engine 21, receiving outside air taken in from the front side of the vehicle body via the dust prevention net 20C. An inlet manifold 26 is provided for supplying the air purified by the air cleaner 25 to the engine 21. An exhaust manifold 27 is linked to the left lateral side of the engine 21. A muffler 30 is flange-connected to a rear end side of the exhaust manifold 27 in a state wrapping around the rear side of the body of the engine 21.

As described above, under the hood 20, on the right lateral side of the two left and right lateral sides of the engine 21, the air cleaner 25 exists, which is a part having a relatively large volume, and many engine peripheral devices exist such as an introducing hose 25a on an air intake side with respect to the air cleaner 25 and a connecting hose 25b connected to the inlet manifold 26. In contrast, on the left lateral side, although the exhaust manifold 27 exists, the muffler 30 that is connected to the exhaust manifold 27 is arranged in a state wrapping around the rear side of the body of the engine 21, and thus, other than the exhaust manifold 27, there are no large engine peripheral devices. This allows an air blowing passage R to be configured on the left lateral side of the engine 21 allowing air from the cooling fan 23 from the radiator 22 side to flow easily. Therefore, the air blowing passage R is utilized as a cooling air passage of the engine 21.

The rear frame 18 erected from the rear side frame portion 10R of the vehicle body frame 10 is fixedly connected to the left and right rear end sides of the rear side frame portion 10R, and is also provided with a function as the vehicle body frame 10. A gate-shaped support frame 29 is erected by having lower end portions on the two sides of the support frame 29 fixed on side plate portions 18A of the rear frame 18. As described above, by fixing the support frame 29 to the side plate portions 18A of the rear frame 18, a forward arm 29a is provided on the gate-shaped support frame 29, which is erected from the vehicle body frame 10 side, in a manner projecting forward from the support frame 29. In the state being supported by the forward arm 29a, the air cleaner 25 is supported in a state inclining obliquely downward toward the rear side in a side view.

(Configuration of Exhaust Gas Flow Passage)

An exhaust gas flow passage 3 of the exhaust gas exhausted from the engine 21 is configured by the exhaust manifold 27, the muffler 30 connected to the exhaust gas side of the exhaust manifold 27, and an exhaust pipe 31 connected to the muffler 30. That is, the exhaust gas flow passage 3 is configured with an exhaust gas flow passage inside the exhaust manifold 27, an exhaust gas flow passage inside the muffler 30, and an exhaust gas flow passage inside the exhaust pipe 31 connected to the muffler 30.

The muffler 30 has the original muffling function, and in addition, is configured as of a catalyst-integrated type in which a catalyst is stored inside the muffler 30 to perform exhaust processing. The muffler 30 is arranged with its lengthwise direction in the lateral direction of the vehicle in a state wrapping around the rear side of the engine 21 and being positioned lower than an upper surface of a head cover 21A of the engine 21. On an upstream side in the exhaust direction of the muffler 30 (left end side in FIGS. 6 and 7), the exhaust manifold 27 is connected; and on a downstream side in the exhaust direction (right end side in FIGS. 6 and 7), the exhaust pipe 31 is connected. The exhaust pipe 31 is configured by an upstream side exhaust pipe portion 33 connected to an exhaust opening 32 provided on an upper portion on the downstream side in the exhaust direction of the muffler 30, and a downstream side exhaust pipe portion 34 connected to the upstream side exhaust pipe portion 33.

As FIGS. 4-8 illustrate, the upstream side exhaust pipe portion 33 is configured by an elbow pipe bent into an L-shape in a rear view, and has a slit 33a formed at a fitting position in the up-down direction of an upstream side end portion, which is externally fitted to the exhaust opening 32 formed on the upper portion of the muffler 30. By forming the slit 33a at the fitting position of the upstream side end portion of the upstream side exhaust pipe portion 33, when being externally fitted to the exhaust opening 32 of the muffler 30, the fitting position at the upstream side end portion of the upstream side exhaust pipe portion 33 is fitted while the slit 33a portion is slightly pushed to expand. This allows the upstream side exhaust pipe portion 33 to be elastically fitted to the exhaust opening 32 and to be mounted while having its position in the vertical direction adjusted. Then, when the upstream side exhaust pipe portion 33 is externally fitted to the exhaust opening 32 and the fitting position is confirmed, a metal tightening band 35 is used to tighten the connection.

An upper end side of a support stay 36 for fixing on the engine 21 side is connected by welding to a laterally oriented pipe portion arranged in a horizontal lateral direction at the upper side of the upstream side exhaust pipe portion 33. A bolt hole 36a is formed on a lower end side of the support stay 36. The lower end side of the support stay 36 is bolt-connected to a second member 50b of a mount bracket 5, which will be described later, fixed on the engine 21 side.

Figure 8:
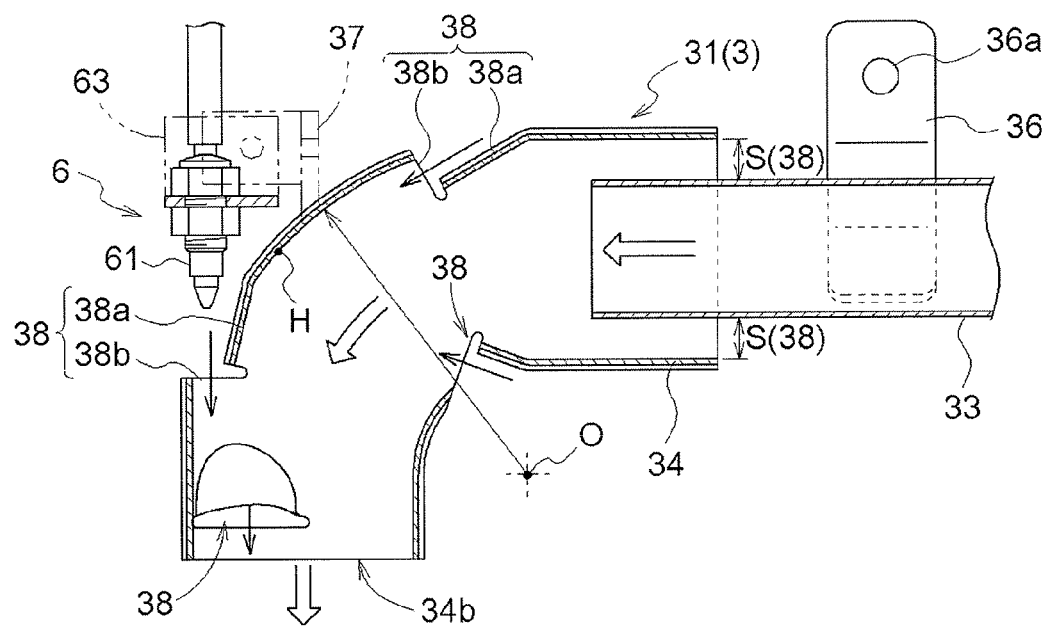
FIG. 8 is a cross sectional view of a mounting position of the exhaust pipe portion and an exhaust gas temperature detection sensor.

As FIGS. 4 and 8 illustrate, the downstream side exhaust pipe portion 34 has a diameter larger than that of a downstream side end portion of the upstream side exhaust pipe portion 33, and is configured by an elbow pipe bent into an L-shape. An upstream side end portion of the downstream side exhaust pipe portion 34 is coaxially externally fitted to the downstream side end portion of the upstream side exhaust pipe portion 33. A downstream side end portion corresponding to a terminal portion of the downstream side exhaust pipe portion 34 is provided in a state facing an exhaust hole 20B formed on a rear end surface 20A of the hood 20 to discharge exhaust gas to the outside of the hood 20.

The downstream side exhaust pipe portion 34 is bolt-connected to a pair of left and right brackets 29b fixed on the support frame 29 erected from the vehicle body frame 10 side, via a pair of left and right mount brackets 37 fixed by welding on the outer peripheral side of the downstream side exhaust pipe portion 34. This allows a gap S corresponding to the diameter difference between the downstream side exhaust pipe portion 34 and the upstream side exhaust pipe portion 33 to be formed at the fitting position of the downstream side exhaust pipe portion 34 and the upstream side exhaust pipe portion 33. The gap S is configured to have a dimension equal to or larger than a spacing enough to avoid contact between the downstream side exhaust pipe portion 34 and the upstream side exhaust pipe portion 33 even when relative movement in the radial direction occurs at the fitting position due to vibration of the engine 21 and the like.

Further, at a plurality of positions in the circumferential direction and in pipe-length direction on the downstream side exhaust pipe portion 34, cooling air incorporation portions 38 are formed. Each of the cooling air incorporation portions 38 is configured by forming an exhaust guiding wall portion 38a by making a partial cut in the circumferential direction of the downstream side exhaust pipe portion 34 and recessing, toward the inner side of the pipe, a pipe peripheral wall portion on an upstream side of the cut in the exhaust gas flow direction; and at the same time, forming an opening 38b between an downstream side end portion of the exhaust guiding wall portion 38a and an arc-shaped peripheral wall of the downstream side exhaust pipe portion 34. That is, the entire downstream side exhaust pipe portion 34 is arranged to face the air blowing passage R of the cooling fan 23, which corresponds to a cooling air passage of the engine 21, and is configured to allow blowing air from the cooling fan 23 side to easily enter through the cooling air incorporation portions 38 at the plurality of positions with respect to the exhaust gas flowed into the downstream side exhaust pipe portion 34. Further, the gap S formed at the fitting position of the downstream side exhaust pipe portion 34 and the upstream side exhaust pipe portion 33 also acts as one of the cooling air incorporation portions 38.

The downstream side exhaust pipe portion 34 and the upstream side exhaust pipe portion 33 are mounted on the support frame 29 or on the second member 50b of the mount bracket 5, which will be described later, of the engine 21 side, in a manner that the laterally oriented pipe portions on the upper sides of the downstream side exhaust pipe portion 34 and the upstream side exhaust pipe portion 33 are arranged at positions above the upper surface of the head cover 21A of the engine 21. Together with the cooling air incorporation portions 38 of the downstream side exhaust pipe portion 34, the laterally oriented pipe portion on the upper side of the upstream side exhaust pipe portion 33 is also arranged to face the air blowing passage R of the cooling fan 23. The downstream side exhaust pipe portion 34 is supported by the support frame 29 in such a manner that the terminal portion of the downstream side exhaust pipe portion 34 is also arranged to face the air blowing passage R of the cooling fan 23; and, as FIG. 4 illustrates, by directing the terminal portion of the downstream side exhaust pipe portion 34 to the exhaust hole 20B provided on the rear end surface 20A of the hood 20, the exhaust direction at an exhaust opening 34b of the terminal portion is arranged along the air blowing direction of the air blowing passage R.

Numerous vent holes 20C are formed over the entire area of the rear end surface 20A (on which the exhaust hole 20B is formed) of the hood 20, including the peripheral area of the exhaust hole 20B, to allow hot air inside the hood 20 to be smoothly discharged.

The mount bracket 5 provided at the mounting portion of the engine 21 and the muffler 30 in order to support the muffler 30 and the upstream side exhaust pipe portion 33 is configured by a combination of a first mount bracket 50, which is made of a sheet metal and is bolt-connected to the engine 21, and a second mount bracket 51, which is made of a sheet metal, is connected to the first mount bracket 50, and supports the muffler 30.

Figure 7:
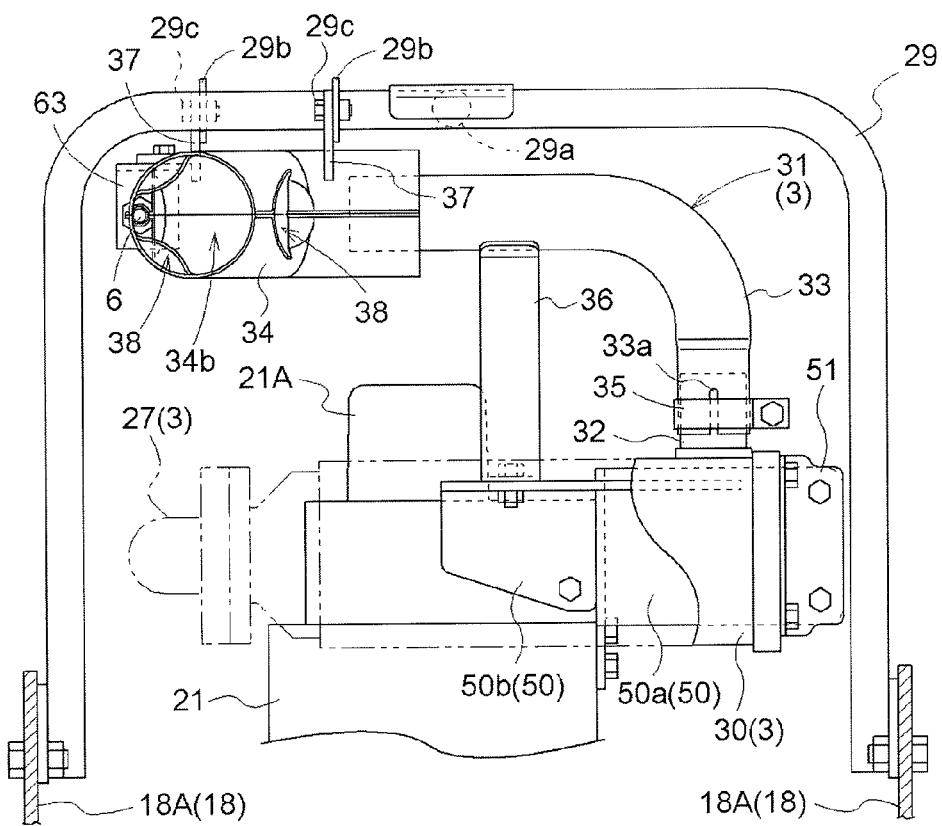
FIG. 7 is a rear view illustrating a mounting state of a muffler and an exhaust pipe portion.

As FIGS. 4, 5, and 7 illustrate, the first mount bracket 50 is configured to include a first member 50a, which is fixedly linked in a state in which one surface bent into an L-shape is brought into contact with a lateral side of the engine 21, and the second member 50b, which integrally extends in the lateral direction from the L-shaped first member 50a. The second mount bracket 51, which is made of a sheet metal and supports the muffler 30, is bolt-connected to the first member 50a of the first mount bracket 50. The lower end side of the support stay 36 for fixing that is connected by welding to the laterally oriented pipe portion of the upstream side exhaust pipe portion 33 is bolt-connected to the second member 50b.

(Exhaust Heat Temperature Detection Device)

Figure 10:
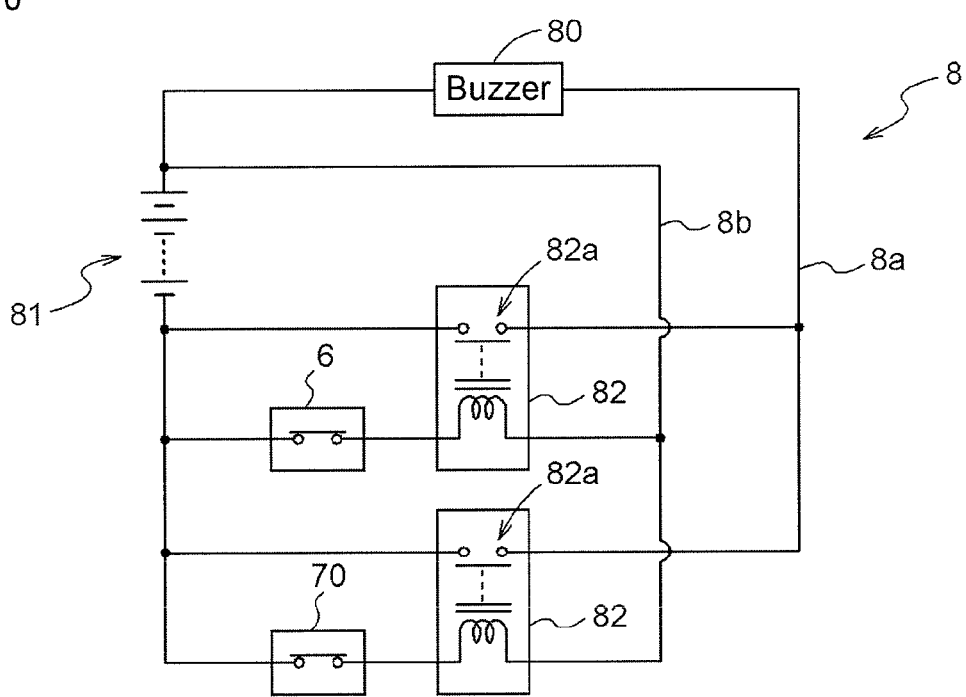
FIG. 10 is a block diagram illustrating a control circuit.

In the riding type mower, an exhaust heat temperature detection device is provided for detecting engine exhaust heat by detecting a temperature of an exhaust gas exhausted from the engine 21 and detecting a temperature of cooling water guided from a water jacket (not illustrated in the drawings) of the engine 21 to the radiator 22. The exhaust heat temperature detection device is provided with an exhaust gas temperature detection sensor 6 positioned in the middle of the exhaust gas flow passage 3 and a cooling water temperature detection sensor 70 positioned in the middle of a cooling water circulation passage 7 guiding cooling water from the engine 21 to the radiator 22. As FIG. 10 illustrates, these exhaust gas temperature detection sensor 6 and cooling water temperature detection sensor 70 are connected to a common control circuit 8. When one or both of the temperatures detected by the detection sensors 6 and 70 reach predetermined temperatures that are respectively configured in the detection sensors 6 and 70, an alarm buzzer 80 (corresponding to a required device) is actuated.

As FIGS. 3-9 illustrate, the exhaust gas temperature detection sensor 6 is arranged on the outside of the exhaust pipe 31 that constitutes the exhaust gas flow passage 3 at a more downstream side than the muffler 30 in the exhaust direction. That is, the exhaust gas temperature detection sensor 6 is positioned on the outside of the pipe peripheral wall near the bending portion of the downstream side exhaust pipe portion 34 of the exhaust pipe 31 and on the far side of the curvature center O of the pipe peripheral wall at the bending portion of the downstream side exhaust pipe portion 34, and in this manner, the exhaust gas temperature detection sensor 6 is connected to the mount bracket 37 located on the downstream side in the exhaust direction, and is attached to the support frame 29 via the mount bracket 37 and the mount bracket 29b that supports the mount bracket 37, the mount bracket 37 being one of the mount brackets 37 that are fixed by welding on the outside of the pipe peripheral wall of the downstream side exhaust pipe portion 34.

Figure 9:
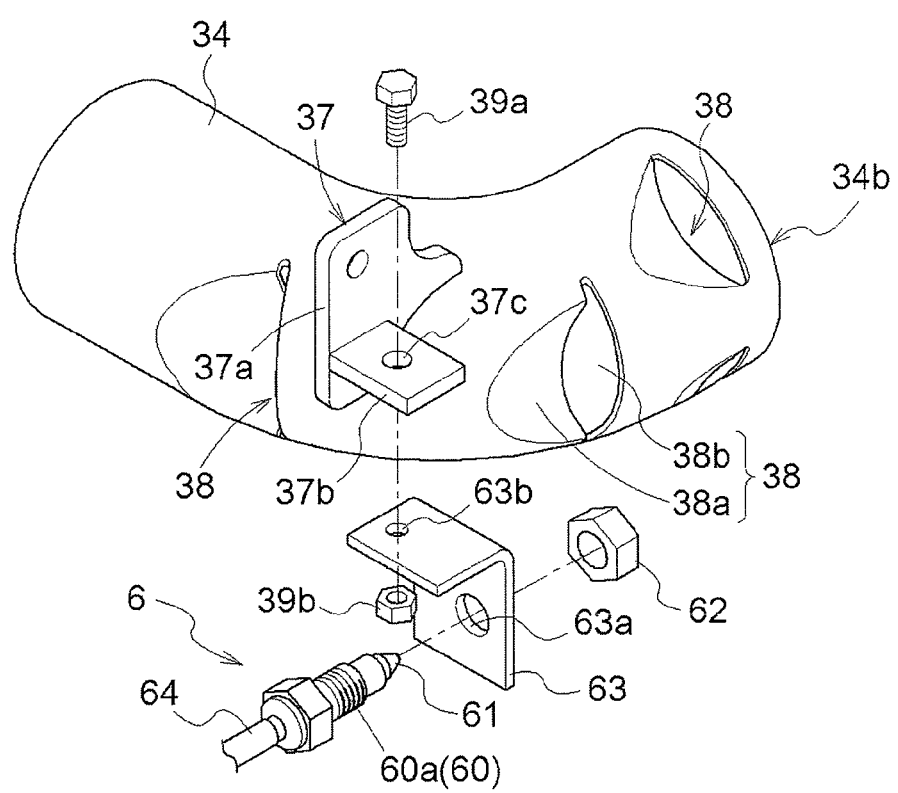
FIG. 9 is an exploded perspective view of the mounting position of the exhaust pipe portion and the exhaust gas temperature detection sensor.

As FIG. 9 illustrates, the mount bracket 37 is provided with a mount base plate 37a fixed by welding on the outside of the pipe peripheral wall of the downstream side exhaust pipe portion 34 and a linking plate 37b extending laterally outward from the mount base plate 37a. A mount bracket 63 of the exhaust gas temperature detection sensor 6 is connected to the linking plate 37b. The mount bracket 63 is provided with a support hole 63a allowing a body portion 60 of the exhaust gas temperature detection sensor 6 to be inserted therethrough and a linking hole 63b for the insertion of a linking bolt 39a with respect to the linking plate 37b. In a state in which the body portion 60 of the exhaust gas temperature detection sensor 6 is inserted through the support hole 63a, a nut 62 is screwed onto a screw portion 60a formed on the body portion 60 to fix the connection. The linking bolt 39a is inserted through a bolt hole 37c formed on the linking plate 37b and the linking hole 63b formed on the mount bracket 63, and a nut 39b is screwed onto the linking bolt 39a to tighten and fix the connection.

As FIGS. 7 and 8 illustrate, in a state of being fixed on the support frame 29 via the mount bracket 63 and the mount bracket 37, the exhaust gas temperature detection sensor 6 is provided on a front end side with a temperature sensitive portion 61 projecting away from the mount bracket 63 toward the downstream side in the exhaust direction, has a conductive wire 64 connected to an end portion on an opposite side of the front end side, and is provided with at the middle portion the body portion 60 supported by the mount bracket 63. The exhaust gas temperature detection sensor 6 is configured by a temperature sensor of a reed switch type, which is provided with a magnet and a reed switch, the magnet using a thermo-ferrite that becomes magnetic only at a temperature equal to or less than a certain temperature. The exhaust gas temperature detection sensor 6 is configured in which, when an atmosphere temperature outside the pipe peripheral wall of the downstream side exhaust pipe portion 34 is below a preset predetermined temperature (for example, about 90° C.), a contact point is closed to maintain an energizing state of the control circuit 8; and when the atmosphere temperature is equal to or above the predetermined temperature, the contact point is opened to break the energizing state of the control circuit 8.

As described above, as FIGS. 4, 7, and 8 illustrate, the exhaust gas temperature detection sensor 6 supported on the support frame 29 is positioned on the outside of the pipe peripheral wall on the far side of the curvature center O of the pipe peripheral wall at the bending portion of the downstream side exhaust pipe portion 34. The temperature sensitive portion 61 of the exhaust gas temperature detection sensor 6 is arranged to be at a location close to a heat spot H that has a high degree of contact with a high temperature exhaust gas flowing inside the downstream side exhaust pipe portion 34. That is, the exhaust gas flowing inside the downstream side exhaust pipe portion 34 along an extension direction of an central axis line of the upstream side exhaust pipe portion 33 has the highest degree of contact with the pipe peripheral wall at the bending portion of the downstream side exhaust pipe portion 34 that intersects with the extension direction of the central axis line of the upstream side exhaust pipe portion 33. The vicinity of this portion becomes the heat spot H. The exhaust gas temperature detection sensor 6 is arranged at a location that allows the atmosphere temperature at an outside area of the pipe peripheral wall at the vicinity of the heat spot H to be easily detected.

Although positioned near the heat spot H, the exhaust gas temperature detection sensor 6 is positioned away from, without contact with, the pipe peripheral wall of the downstream side exhaust pipe portion 34 and is positioned within the air blowing passage R of the cooling fan 23. Therefore, even when the temperature (for example, about 300° C.) of the exhaust gas flowing inside the downstream side exhaust pipe portion 34 is much higher than the predetermined temperature of the exhaust gas temperature detection sensor 6, when the temperature is within an acceptable range in a normal operation condition, the atmosphere temperature at the outside area of the pipe peripheral wall where the exhaust gas temperature detection sensor 6 is arranged is maintained within a range that does not exceed the predetermined temperature. In a case where, under the influence of poor combustion of the engine 21 and the like, the temperature of the exhaust gas discharged from the muffler 30 becomes abnormally high (for example, about 600° C.), the atmosphere temperature at the outside of the pipe peripheral wall where the exhaust gas temperature detection sensor 6 is arranged also exceeds the predetermined temperature. Therefore, the abnormal temperature rise can be precisely and promptly detected. In this regard, when an abnormal temperature rise is detected, the atmosphere temperature in the surrounding area of where the exhaust gas temperature detection sensor 6 is arranged is only at a degree exceeding the predetermined temperature, so that the exhaust gas temperature detection sensor 6 is not in a state exposed to an atmosphere temperature close to the temperature of the exhaust gas. Therefore, an exhaust gas temperature detection sensor 6 with a low to-be-detected predetermined temperature can be used.

As FIGS. 3 and 4 illustrate, the cooling water temperature detection sensor 70 detecting a temperature of cooling water guided from the engine 21 to the radiator 22 is provided at the middle of the cooling water circulation passage 7 from the water jacket (not illustrated in the drawings) of the engine 21 to the radiator 22. The cooling water temperature detection sensor 70 is configured to have the same structure as the exhaust gas temperature detection sensor 6 and to have the same predetermined temperature. A temperature sensitive portion (not illustrated in the drawings) of the cooling water temperature detection sensor 70 is arranged to be used in a state of being inserted into the cooling water circulation passage 7. The temperature of the cooling water flowing inside the cooling water circulation passage 7 is detected.

As FIG. 10 illustrates, the exhaust gas temperature detection sensor 6 and the cooling water temperature detection sensor 70 are connected to the common control circuit 8. The control circuit 8 includes a main circuit 8*a* connecting the alarm buzzer 80 to a power source 81 and an operating circuit 8*b* connecting the exhaust gas temperature detection sensor 6 and the cooling water temperature detection sensor 70 to the power source 81. When any one or both of the temperatures detected by the detection sensors 6 and 70 have reached the predetermined temperatures of about the same degree that are respectively set to the detection sensors 6 and 70, the energizing of the operating circuit 8*b* of the control circuit 8 is cut off, and the main circuit 8*a*, on which the alarm buzzer 80 is connected, is energized. Thereby, sounding of the alarm buzzer 80 is activated.

That is, the exhaust gas temperature detection sensor 6 and the cooling water temperature detection sensor 70 are each configured by a temperature sensor of a reed switch type, which is provided with a magnet and a reed switch, the magnet using a thereto-ferrite that becomes magnetic only at a temperature equal to or less than a certain temperature. The exhaust gas temperature detection sensor 6 and the cooling water temperature detection sensor 70 are configured in which, when the atmosphere temperature outside the pipe peripheral wall of the downstream side exhaust pipe portion 34 is below the preset predetermined temperature (for example, about 90° C.), or when the temperature of the cooling water flowing inside the cooling water circulation passage 7 is below the preset predetermined temperature (for example, about 90° C.), the contact point is closed to maintain an energizing state of the operating circuit 8*b* of the control circuit 8; and when the atmosphere temperature or the temperature of the cooling water is equal to or above the predetermined temperature, the contact point is opened to break the energizing state of the operating circuit 8*b* of the control circuit 8.

In each of the exhaust gas temperature detection sensor 6 and the cooling water temperature detection sensor 70, a relay 82 including an opening and closing switch 82*a* is connected. When the exhaust gas temperature detection sensor 6 and the cooling water temperature detection sensor 70 are each in an energizing state (state illustrated in FIG. 10), the opening and closing switch 82*a*, which is connected to the main circuit 8*a*, is excited by the relay 82 to be kept in an "open" state. The opening and closing switch 82*a* is spring-biased toward a "close" side. In the state of being excited by the relay 82, the opening and closing switch 82*a* is kept in the "open" state against the spring-biasing force. When energizing is cut off for any one or both of the exhaust gas temperature detection sensor 6 and the cooling water temperature detection sensor 70, energizing in the operating circuit 8*b* with respect to the relay 82 connected to the exhaust gas temperature detection sensor 6 or the cooling water temperature detection sensor 70, which are connected to the operating circuit 8*b*, is cut off, and the excitation by the relay 82 is released. Therefore, the opening and closing switch 82*a*, which is connected to the main circuit 8*a*, is operated into the "close" state by its own spring biasing force, and sounding of the alarm buzzer 80 of the main circuit 8*a* is activated by the power source 81.

Figure 11:
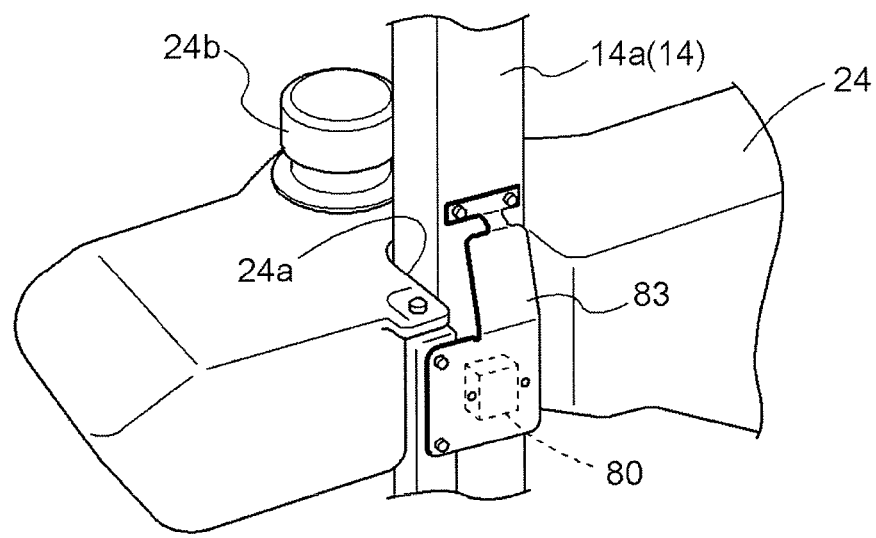

As FIG. 11 illustrates, the alarm buzzer 80, together with a relay, is fixed on a mount plate 83 mounted on an inner side of a left side leg portion 14*a* fitted in the recess 24*a* of the fuel tank 24, the leg portion 14*a* being a portion of the gate-shaped rollover protection frame 14 provided to the rear of the driver seat 13. As described above, by fixing the alarm buzzer 80 to the leg portion 14*a* of the rollover protection frame 14 via the mount plate 83, the alarm buzzer 80 is mounted at a location being sandwiched between the mount plate 83 and the leg portion 14*a* of the rollover protection frame 14. As FIG. 1 illustrates, this location of the mount plate 83 is a location relatively close to the driver seat 13 in the longitudinal direction and is a location corresponding to the outside of the hood 20, and thus is a location easy for a driver seated on the driver seat 13 to hear the sounding of the alarm buzzer 80.

(Balance Weight)

Figure 6:
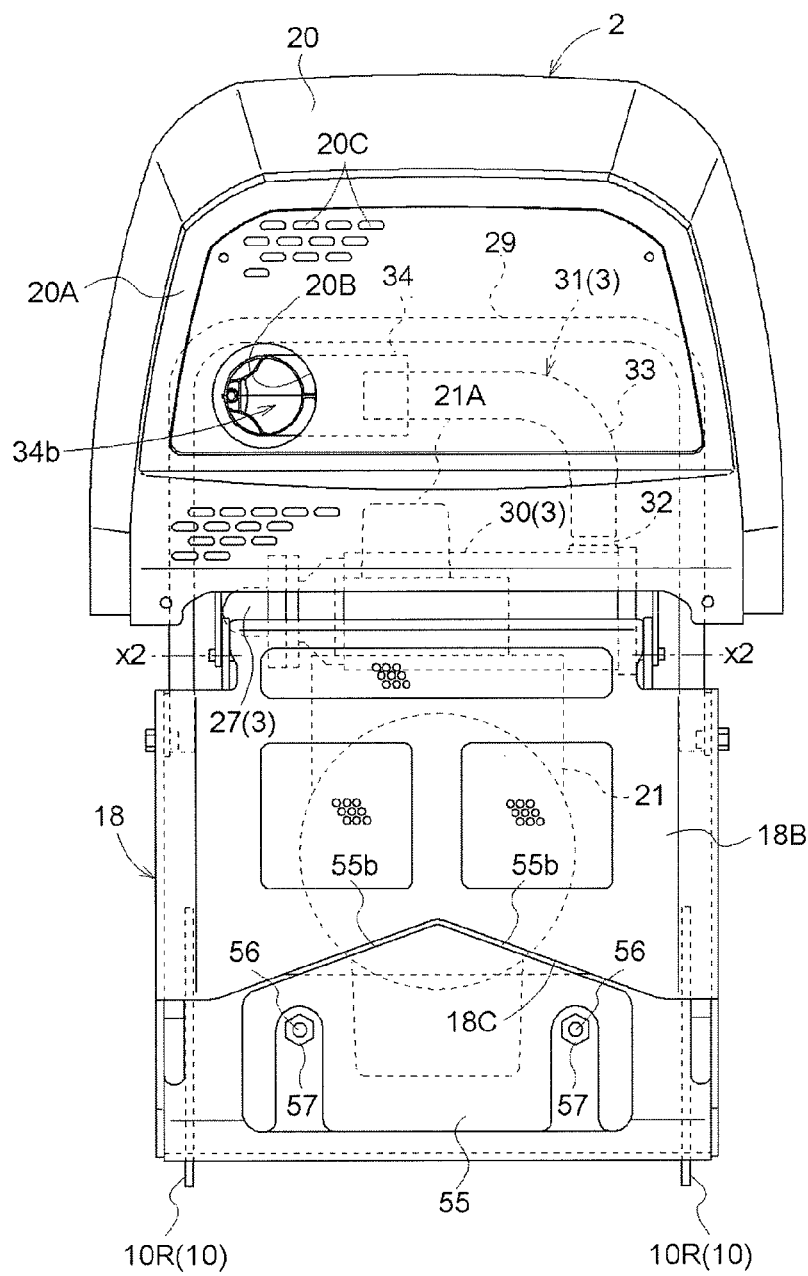
FIG. 6 is a rear view of the drive unit.

As FIGS. 3, 5, and 6 illustrate, on the rear end portion of the self-propelled vehicle body 1, a balance weight 55 is mounted. By fitting longitudinally oriented mount holes 55*a* to stud bolts 56 that project rearward from the rear portion of the vehicle body frame 10, and by tightening nuts 57 from the rear side to fix the connection, the balance weight 55 is mounted to the self-propelled vehicle body 1. An upper surface side of the balance weight 55 is elevated into a mountain-like shape at the middle, forming inclined surfaces 55*b* such that, when mowed grass and the like that get into the inside of the hood 20 fall down from a lower side opening of the rear frame 18, the mowed grass and the like fall down to the two left and right sides without being accumulated on the upper surface of the balance weight 55.

A lower edge of a rear surface 18B of the rear frame 18 is cut into an inverted V-shape along the mountain shape of the upper surface side of the balance weight 55 to form a cutout portion 18C. Therefore, when the mount holes 55*a* of the balance weight 55 are fitted to the stud bolts 56, the cutout portion 18C can also act as a guiding member guiding in such a manner that, by fitting the mountain shape of the upper surface side of the balance weight 55 to the cutout portion 18C, centers of the mount holes 55a are easily matched to the locations of the stud bolts 56.

Other Embodiment 1

In the above-described embodiment, as the exhaust gas temperature detection sensor 6 and the cooling water temperature detection sensor 70, sensors of the same specifications are used. However, the present invention is not limited to this. It is also possible to use sensors of different specifications. Further, the configured predetermined temperatures also are not necessary to be the same. Different predetermined temperatures may be configured. Other configurations may adopt the configurations similar to the above-described embodiment.

Other Embodiment 2

Figure 12:
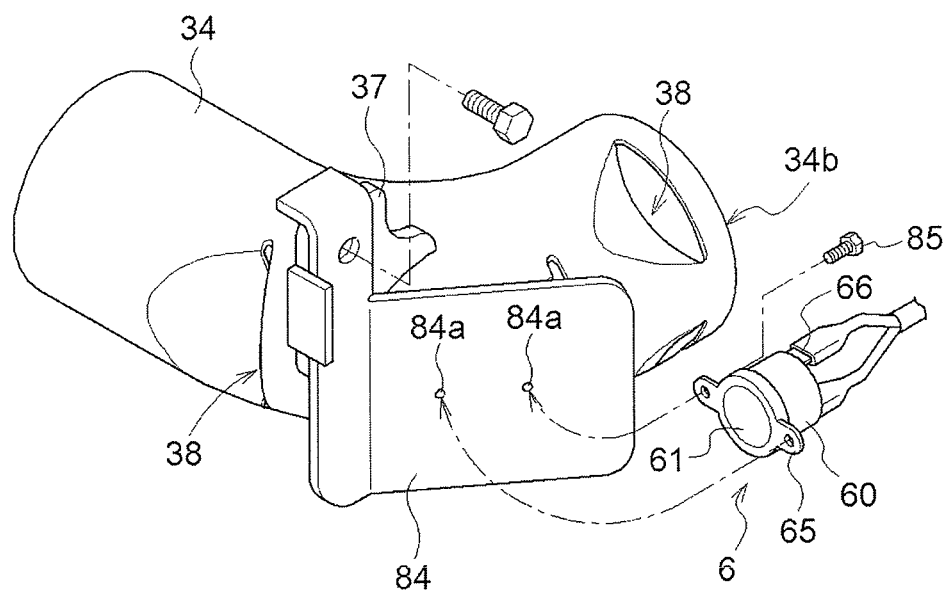
FIG. 12 is a perspective view illustrating a mounting structure of an exhaust gas temperature detection sensor of another embodiment.
Figure 13:
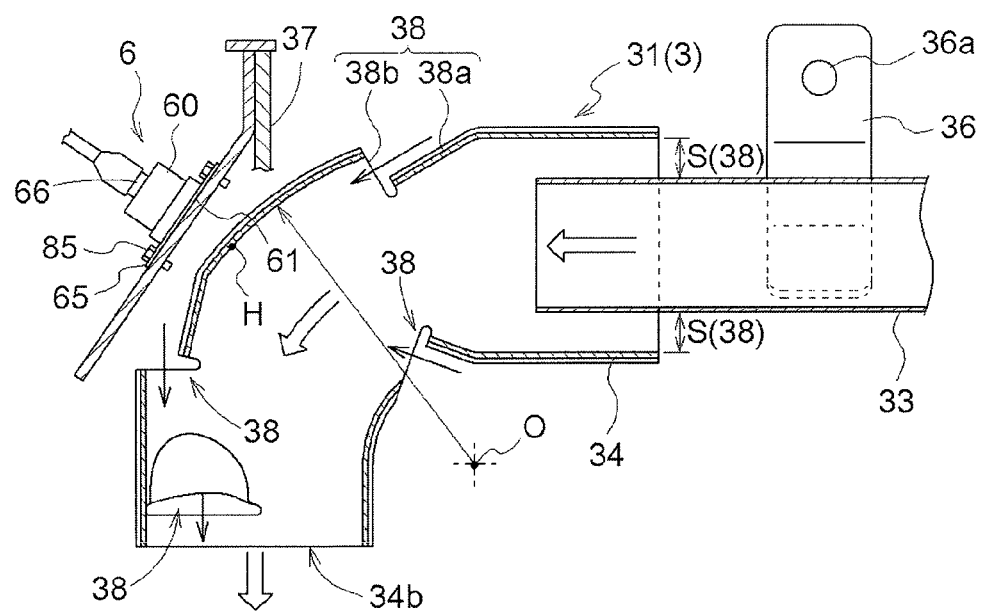
FIG. 13 is a plan view illustrating the mounting structure of the exhaust gas temperature detection sensor of the other embodiment.

In the above-described embodiment, as the exhaust gas temperature detection sensor 6 and the cooling water temperature detection sensor 70, the sensor is described that is configured by a temperature sensor of a reed switch type, which is provided with a magnet and a reed switch, the magnet using a thermo-ferrite that becomes magnetic only at a temperature equal to or less than a certain temperature. However, the exhaust gas temperature detection sensor 6 is not limited to this, and may also be configured as follows. That is, as FIGS. 12 and 13 illustrate, the exhaust gas temperature detection sensor 6 may also be configured by a bimetal type temperature sensor in which a bimetal (not illustrated in the drawings) is arranged inside a body portion 60, which is formed in a cylindrical shape; a temperature sensitive portion 61 and fasteners 65 for mounting on a mount plate 84 are provided on one flat end side; and connecting terminals 66 for connecting conductive wires are provided on the other flat end side.

In this structure, on the mount plate 84 side on which the exhaust gas temperature detection sensor 6 is mounted, only insertion holes 84a of fastening bolts 85 inserted in the fasteners 65 are formed, without forming a through hole exposing the temperature sensitive portion 61 of the exhaust gas temperature detection sensor 6 to the exhaust pipe 31 side, the temperature of which is to be detected. Therefore, the temperature sensitive portion 61 of the exhaust gas temperature detection sensor 6 is mounted in a manner facing a surface of the mount plate 84 opposite to the side facing the exhaust pipe 31, and is in a state of being shielded by the mount plate 84 in the middle between the temperature sensitive portion 61 and the exhaust pipe 31, the temperature of which is to be detected. For this reason, the temperature sensitive portion 61 of the exhaust gas temperature detection sensor 6 indirectly detects heat transmitted from the exhaust pipe 31 side to the mount plate 84 based on an increase in the temperature of the mount plate 84.

In the case of using such a bimetal type temperature sensor to configure the exhaust gas temperature detection sensor 6, the control circuit 8 may be configured similar to the case where the reed switch type temperature sensor is used to configure the exhaust gas temperature detection sensor 6, as illustrated in FIG. 10, in which, when an atmosphere temperature is below a preset predetermined temperature, a contact point is closed to maintain an energizing state of the control circuit 8, and when the atmosphere temperature is equal to or above the predetermined temperature, the contact point is opened to break the energizing state of the control circuit 8. The control circuit 8 may also be configured differently in which, when the atmosphere temperature is below the preset predetermined temperature, the contact point is opened to break the energizing state of the control circuit 8, and when the atmosphere temperature is equal to or above the predetermined temperature, the contact point is closed to maintain the energizing state of the control circuit 8. As described above, in the case of using the bimetal type temperature sensor configured in such a manner that, when the atmosphere temperature is below the preset predetermined temperature, the contact point is opened to break the energizing of the control circuit 8, and when the atmosphere temperature is equal to or above the predetermined temperature, the contact point is closed to maintain the energizing state of the control circuit 8, it is not necessary to use the relay 82 in the operating circuit 8b; and the exhaust gas temperature detection sensor 6 may be configured to be directly connected to the main circuit 8a. When using such a bimetal sensor to configure the exhaust gas temperature detection sensor 6, switching operation of the exhaust gas temperature detection sensor 6 at the time when the atmosphere temperature reaches the predetermined temperature or higher can be promptly and easily performed with good responsiveness. Other configurations may adopt the configurations similar to the above-described embodiment.

Other Embodiment 3

In the above-described embodiments, the exhaust gas temperature detection sensor 6 and the cooling water temperature detection sensor 70 are configured by temperature sensors of the reed switch type, each of which is provided with a magnet and a reed switch, the magnet using a thermo-ferrite that becomes magnetic only at a temperature equal to or less than a certain temperature, or the exhaust gas temperature detection sensor 6 is configured by using a bimetal type temperature sensor. However, the temperature sensors are not limited to these. The exhaust gas temperature detection sensor 6 and the cooling water temperature detection sensor 70 may also be configured by using a thermal fuse. Such a thermal fuse is formed by welding a lead wire to a low-melting-point fusible metal, and is configured in such a manner that, when the thermal fuse senses heat of a predetermined temperature or higher via the thermal fuse body or the lead wire, by the melting of the fusible metal, a contact point is opened to break energizing. Such a thermal fuse can be arranged and used in the control circuit 8 as illustrated in FIG. 10. Other configurations may adopt the configurations similar to the above-described embodiment.

Other Embodiment 4

In the above-described embodiments, the exhaust gas temperature detection sensor 6 is provided on the exhaust gas flow passage 3; the exhaust pipe 31 that constitutes the exhaust gas flow passage 3 is configured to include the upstream side exhaust pipe portion 33 provided on the upstream side in the exhaust direction and the downstream side exhaust pipe portion 34 on the downstream side in the exhaust direction; and the exhaust gas temperature detection sensor 6 is provided on the outside of the downstream side exhaust pipe portion 34. However, the arrangement of the exhaust gas temperature detection sensor 6 is not limited to this. For example, the exhaust gas temperature detection sensor 6 may also be provided on the outside of the upstream side exhaust pipe portion 33. Or, the exhaust pipe 31 may be configured as an one-piece exhaust pipe 31 without making distinction between the upstream side exhaust pipe portion 33 and the downstream side exhaust pipe portion 34, and the exhaust gas temperature detection sensor 6 may be provided at any suitable position on the outside of the exhaust pipe 31. Further, when the exhaust gas temperature detection sensor 6 is provided on the exhaust gas flow passage 3, the exhaust gas temperature detection sensor 6 may also be provided on the outside of the muffler 30, not the exhaust pipe 31, to detect an atmosphere temperature at a certain area in the surrounding area of the muffler 30. In this case, the exhaust gas temperature detection sensor 6 may be arranged at an outside area easily detecting that the temperature of the exhaust gas flowing inside the muffler 30 has reached a high temperature equal to or higher than a predetermined temperature, and to detect an atmosphere temperature lower than the temperature of the exhaust gas inside the muffler 30. Other configurations may adopt the configurations similar to the above-described embodiment.

Other Embodiment 5

In the above-described embodiments, as the required device, the alarm buzzer 80 is described as an example. However, the required device is not limited to this. For example, a lamp or a voice may also be used for alarming. Further, when a display device such as a monitor is provided, an alarming text, sign, and the like may also be displayed on the display device. Further, in conjunction with a control device of the engine 21, when the temperature detected by the exhaust gas temperature detection sensor 6 and the cooling water temperature detection sensor 70 is above a predetermined temperature, control operations such as stopping the actuation of the engine 21 or putting the engine 21 into an idling state may be performed. Further, for a configuration in which external power retrieval of a PTO shaft and the like for driving the mower 4 can be performed, it is also possible to stop external power retrieval by turning off PTO clutch to break driving of the PTO shaft. Other configurations may adopt the configurations similar to the above-described embodiment.

Other Embodiment 6

The engine 21 is not limited to a water-cooled gasoline engine as described in the above embodiments. The engine 21 may also be of an air-cooled type, or a diesel engine. Other configurations may adopt the configurations similar to the above-described embodiment.

Other Embodiment 7

The engine 21 is not limited to a longitudinal arrangement in which the output shaft is in a front-rear orientation. A horizontal arrangement in which the output shaft is in a horizontal-rearward direction is also possible. Further, the engine 21 may also be arranged on the front side of the vehicle body. In a structure in which the engine 21 is arranged on the front side of the vehicle body and cooling air is sent from the rear side, the muffler 30 may be arranged on the front side of the engine 21, and the exhaust gas temperature detection sensor 6 may be provided on the outside of the muffler 30 arranged on the front side of the engine 21 or the outside of the exhaust pipe 31, and may be positioned within the air blowing passage R. Further, in the above-described embodiments, a structure is described in which the inlet manifold 26 is arranged on the right side of the engine 21; the exhaust manifold 27 is arranged on the left side of the engine 21; the upstream side of the exhaust pipe 31 is arranged on the right side; and the downstream side of the exhaust pipe 31 is arranged on the left side. However, without being limited to this, a structure may also be adopted where the structure described in the above embodiments is switched symmetrically in the left and right direction; that is, the inlet manifold 26 is arranged on the left side of the engine 21; the exhaust manifold 27 is arranged on the right side of the engine 21; the upstream side of the exhaust pipe 31 is arranged on the left side; and the downstream side of the exhaust pipe 31 is arranged on the right side. In any case, the exhaust gas temperature detection sensor 6 is arranged within the air blowing passage R. Other configurations may adopt the configurations similar to the above-described embodiment.

INDUSTRIAL APPLICABILITY

As described in the embodiments, without being limited to a riding type mower, the engine exhaust heat temperature detection device of the present invention is applicable to a tractor, a combine, a movable farm machine such as a rice planting machine, and a variety of working vehicles mounted with an engine such as a construction machine, a transport vehicle, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An engine exhaust heat temperature detection device comprising:
an exhaust gas temperature detection sensor arranged at a position so as not to be directly exposed to exhaust gas;
said position being outside of an exhaust pipe peripheral wall on a far side of a curvature center, and outside a muffler provided in an exhaust gas flow passage of an engine, the muffler having a portion that causes internal moving exhaust gases to impinge at a heat spot, wherein the exhaust gas temperature detection sensor is located outside of the muffler adjacent to the heat spot and adapted to detect that an atmosphere temperature at the position outside the muffler has reached a predetermined temperature indicative of an increase in a temperature inside the muffler, or outside an exhaust pipe constituting the exhaust gas flow passage on a more downstream side than the muffler in an exhaust direction, the exhaust pipe having a portion that causes internal moving exhaust gases to impinge at a heat spot, wherein the exhaust gas temperature detection sensor is located outside of the exhaust pipe adjacent to the heat spot and adapted to detect that an atmosphere temperature at the position outside the exhaust pipe has reached a predetermined temperature indicative of an increase in a temperature of an exhaust gas inside the exhaust pipe.

2. The engine exhaust heat temperature detection device according to claim 1, wherein
the exhaust gas temperature detection sensor is arranged within an air blowing passage that is used for cooling of the engine.

3. The engine exhaust heat temperature detection device according to claim 1, wherein
the exhaust gas temperature detection sensor detecting that an atmosphere temperature at the position outside the exhaust pipe has reached a predetermined temperature is provided near a bending portion of the exhaust pipe.

4. The engine exhaust heat temperature detection device according to claim 3, wherein
the exhaust gas temperature detection sensor is mounted on a support frame supporting the exhaust pipe.

5. The engine exhaust heat temperature detection device according to claim 1 further comprising:
a cooling water temperature detection sensor provided separately from the exhaust gas temperature detection sensor, detecting a temperature of cooling water in a radiator,
wherein, the exhaust gas temperature detection sensor and the cooling water temperature detection sensor are connected to a common control circuit, and,
when at least one of the temperatures detected by the two detection sensors reaches the predetermined temperatures that are respectively configured in the detection sensors, a required device is actuated.

6. An engine exhaust heat temperature detection device comprising:
an exhaust gas temperature detection sensor located outside an exhaust gas conveying arrangement conveying the exhaust gas from an engine to an exhaust gas discharge opening and having a portion that causes internal moving exhaust gases to impinge at a heat spot; and outside of an exhaust pipe peripheral wall on a far side of a curvature center, and
said exhaust gas detection sensor being structured and arranged to detect a predetermined temperature of an atmosphere arranged outside of the exhaust gas conveying arrangement adjacent to the heat spot,
wherein, when said atmosphere is heated to the predetermined temperature by the exhaust gas being conveyed within the exhaust gas conveying arrangement, the exhaust gas temperature detection sensor detects the predetermined temperature of the atmosphere.

7. The engine exhaust heat temperature detection device according to claim 6, wherein the exhaust gas conveying arrangement comprises an exhaust pipe.

8. The engine exhaust heat temperature detection device according to claim 6, wherein the atmosphere arranged outside of the exhaust gas conveying arrangement is within an air blowing passage that is used for cooling of an engine.

9. The engine exhaust heat temperature detection device according to claim 6, wherein the exhaust gas conveying arrangement comprises a muffler and the atmosphere is arranged outside the muffler.

10. The engine exhaust heat temperature detection device according to claim 6, wherein the exhaust gas conveying arrangement comprises an exhaust pipe and a muffler and the atmosphere is arranged outside the exhaust pipe and downstream of the muffler relative to an exhaust gas flow direction.

11. The engine exhaust heat temperature detection device according to claim 6, wherein the exhaust gas temperature detection sensor is located outside a wall of a section of the exhaust gas conveying arrangement.

12. The engine exhaust heat temperature detection device according to claim 6, wherein the exhaust gas temperature detection sensor is located outside a wall of a curved section of the exhaust gas conveying arrangement.

13. The engine exhaust heat temperature detection device according to claim 6, wherein said exhaust gas conveying arrangement comprises a muffler and an exhaust pipe and the exhaust gas temperature detection sensor is located outside a wall of a curved pipe section of the exhaust pipe located downstream of the muffler relative to an exhaust gas flow direction.

14. An engine exhaust heat temperature detection device comprising:
an exhaust gas temperature detection sensor arranged outside of an exhaust pipe peripheral wall on a far side of a curvature center, and outside each of:
an exhaust pipe having a portion that causes internal moving exhaust gases to impinge at an exhaust pipe heat spot; and
a muffler having a portion that causes internal moving exhaust gases to impinge at a muffler heat spot;
said exhaust gas temperature detection sensor being positioned so as to not be directly exposed to exhaust gas in the exhaust pipe and the muffler and adjacent to at least one of the exhaust pipe heat spot and the muffler heat spot,
wherein, when an atmosphere adjacent the exhaust gas temperature detection sensor is heated by the exhaust gas arranged within the exhaust pipe or the muffler, the exhaust gas temperature detection sensor indirectly detects a temperature of the exhaust gas by detecting a temperature of the atmosphere.

15. The engine exhaust heat temperature detection device according to claim 14, wherein the exhaust pipe is arranged downstream of the muffler relative to an exhaust gas flow direction.

16. The engine exhaust heat temperature detection device according to claim 14, wherein the temperature of the atmosphere is a predetermined temperature.

17. The engine exhaust heat temperature detection device according to claim 14, wherein the exhaust gas temperature detection sensor is located outside and spaced from a wall of a section of the exhaust pipe.

18. The engine exhaust heat temperature detection device according to claim 14, wherein the exhaust gas temperature detection sensor is located outside and spaced from a wall of a curved section of the exhaust pipe.

19. The engine exhaust heat temperature detection device according to claim 14, wherein the exhaust gas temperature detection sensor is located outside and adjacent a wall of a curved pipe section of the exhaust pipe located downstream of the muffler relative to an exhaust gas flow direction.

20. The engine exhaust heat temperature detection device according to claim 14, wherein the engine exhaust heat temperature detection device is arranged on a riding mower and wherein both the exhaust gas temperature detection sensor is coupled to an alarm circuit.

* * * * *